US005293431A

United States Patent [19]

Hayduchok et al.

[11] Patent Number: 5,293,431

[45] Date of Patent: Mar. 8, 1994

[54] SYSTEM FOR ORIENTING DOCUMENTS IN THE AUTOMATED PROCESSING OF BULK MAIL AND THE LIKE

[75] Inventors: George L. Hayduchok, Mantua; William L. Heins, III, Medford, N.J.

[73] Assignee: Opex Corporation, Moorestown, N.J.

[21] Appl. No.: 756,930

[22] Filed: Sep. 6, 1991

[51] Int. Cl.$^5$ .............. G06K 9/32

[52] U.S. Cl. .............. 382/46; 382/45; 358/488

[58] Field of Search .............. 382/45, 46, 7, 1; 358/488; 209/900; 235/437

[56] References Cited

U.S. PATENT DOCUMENTS

| | | | |
|---|---|---|---|
| 4,984,280 | 1/1991 | Abe | 382/46 |
| 5,038,393 | 8/1991 | Nanba | 382/46 |
| 5,063,599 | 11/1991 | Concannon et al. | 382/7 |

FOREIGN PATENT DOCUMENTS

| | | |
|---|---|---|
| 0281007 | 9/1988 | European Pat. Off. . |
| 0399808 | 11/1990 | European Pat. Off. . |
| 62-127652 | 6/1987 | Japan . |
| WO8801543 | 3/1988 | PCT Int'l Appl. . |

*Primary Examiner*—Yon J. Couso
*Attorney, Agent, or Firm*—Weiser & Associates

[57] ABSTRACT

A series of documents to be processed are optically inspected, and compared with a reference standard to identify the relative orientation of each document. To this end, an image acquired from the document (preferably from each side of the document) is focused on an array of picture elements (pixels) for electronically converting the acquired image to digital form. This produces a digitally encoded image, which can be enhanced if desired, defined by an array of pixels corresponding to the acquired image. For each acquired image, two reference areas, which are preferably symmetrically located on the document, are inspected for the presence of a preselected reference mark. Location of the reference mark in one of the two reference areas operates to determine the orientation of the document. Upon locating the reference mark on the document, identifying the orientation of the document relative to the apparatus, the document may then be mechanically re-oriented so that the documents are placed in a uniform orientation for further processing, if desired.

4 Claims, 6 Drawing Sheets

Microfiche Appendix Included
(4 Microfiche, 343 Pages)

FIG. 5
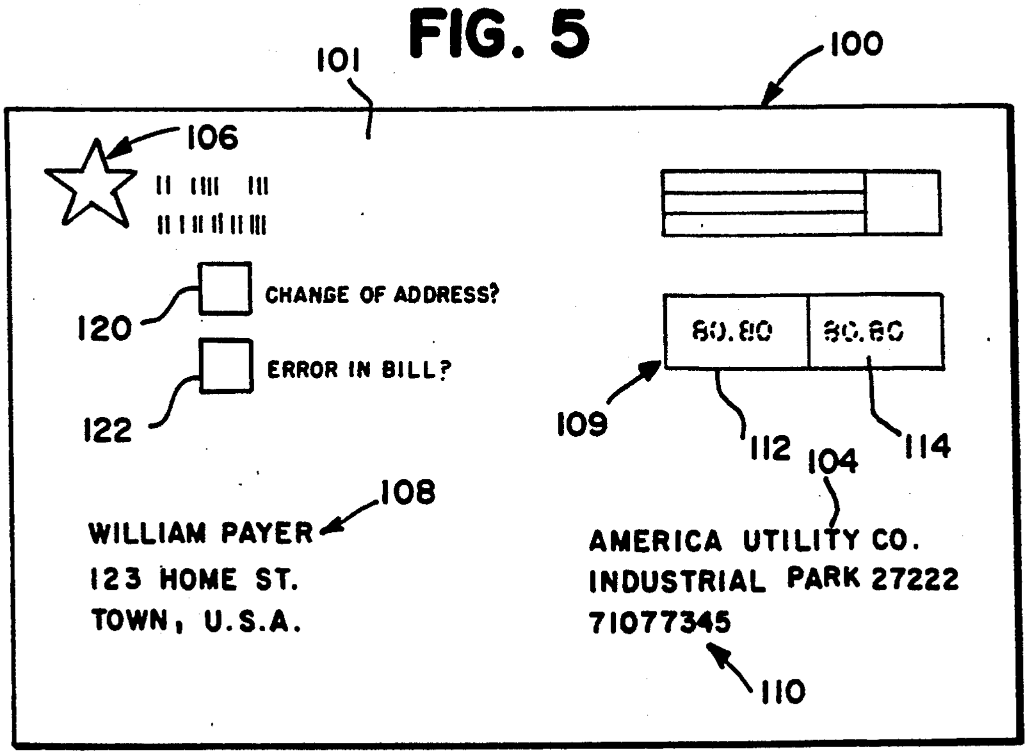
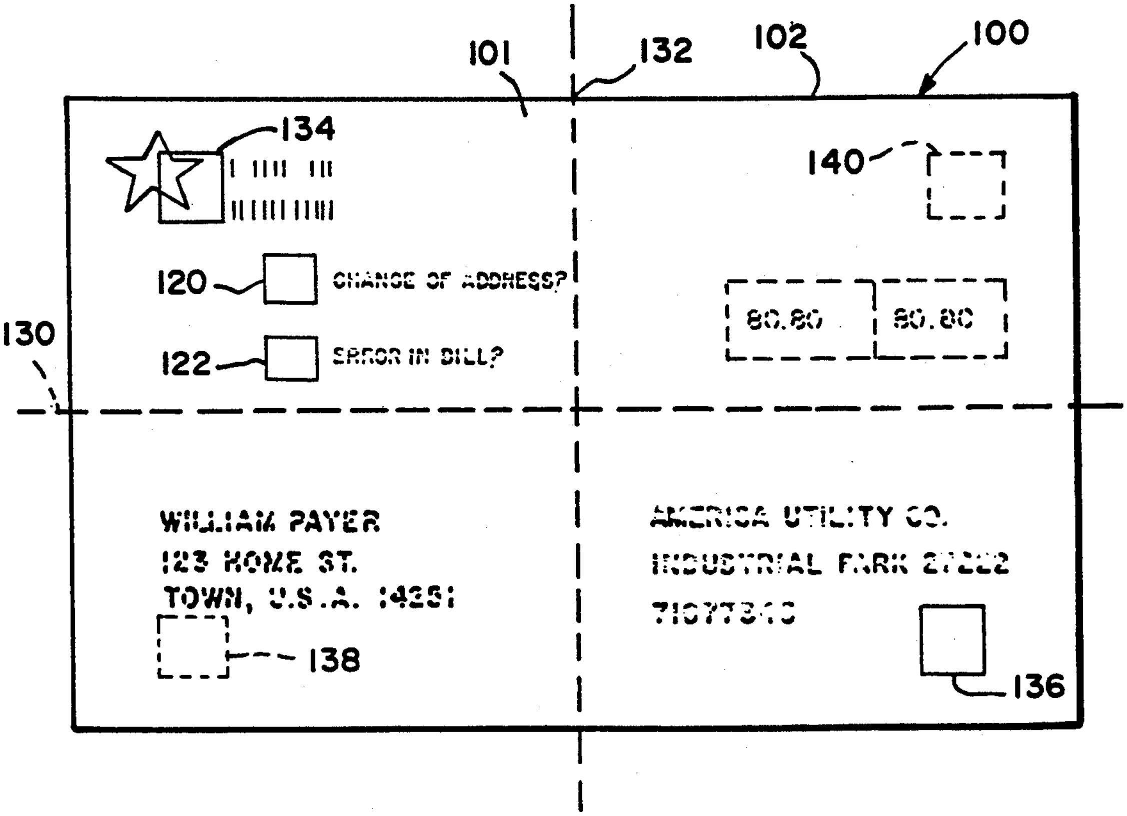
FIG. 6

SYSTEM FOR ORIENTING DOCUMENTS IN THE AUTOMATED PROCESSING OF BULK MAIL AND THE LIKE

MICROFICHE APPENDIX

A Microfiche Appendix including four (4) fiche bearing a computer program listing of 343 pages has been submitted in connection with this patent application.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

The present invention relates to a system for determining the orientation of a series of documents, such as cheeks and invoices, in the context of the automated processing of such documents.

BACKGROUND OF THE INVENTION

Highly automated apparatus for processing bulk mail in a continuous procedure are known, such as in U.S. Pat. No. 4,863,037, issued to the assignee of the present invention. Such an apparatus typically includes an operative combination of processing stations, such as an input station for receiving the incoming mail in bulk and for separating the envelopes for individual delivery to the remainder of the apparatus; a detection station for detecting irregularities in the contents of the envelopes, such as the detection of metal items (staples, paper clips), folded contents, etc.; a station for out-sorting envelopes rejected at the detection station; a station for opening the envelopes along multiple edges; and a station for extracting the contents from the opened envelopes, for subsequent processing of the extracted contents.

A typical apparatus 1 for such automated processing of bulk mail is shown in FIGS. 1 and 2. FIG. 1 is an isometric view of the apparatus and FIG. 2 is a top plan view of the apparatus, showing the relationship among the various stations of the apparatus. As shown, bulk mail may be taken directly from mail trays 2 in an off-load position 3, and placed on an input conveyor 4 which delivers the received envelopes into the processing unit 5.

FIG. 2 shows, by dotted lines, the path of the envelopes (and later the extracted documents) through the various stations of the processing unit 5. The stacks of envelopes 25 in conveyor 4 are delivered edgewise from the stack and passed through a scanning station 26. Scanning station 26 primarily operates to identify envelopes which may include staples or paper clips, or envelopes not of the desired dimension. Rejected envelopes are removed from the stream at sorting station 27 and collected in reject trays 6,7. Accepted envelopes are passed through an edge-severing station 28 which operates to sever edges of the envelopes, preferably plural edges, to ready the envelopes for the extraction of contents. An extraction station 29 is provided to receive the edge-severed envelopes and to separate the faces of each envelope, releasing the contents located between them. After the contents are removed, the envelope faces are discarded, and the contents pass from the extraction station 29. If the extraction procedure was unsuccessful for a given envelope, the envelope faces and contents are re-united, and diverted from the processing path for special attention at out-sort tray 18.

Extracted contents, after passing through turnabout station 30 (which serves to allow a more compact configuration of the apparatus), are passed through a justification station 32 which aligns the documents for presentation to a detection station 33 capable of determining the orientation of certain documents (e.g., checks), and then through a reversal station 34 and a twisting station 35 for aligning documents according to signals received from the detection station 33. Further detail regarding the functions of the aforementioned stations is provided in the above-identified U.S. Pat. No. 4,863,037, which is fully incorporated herein by reference. At the end of the process, the separated documents are collected in stacking units 12. If desired, different types of documents (e.g., checks and invoices) can be stacked separately in different bins of the stacking unit 12.

The most common type of envelope to be opened by such an apparatus will include a check and an invoice, such as would be sent to utilities or credit-card companies. Often, the check is sent together with a pre-printed invoice which is placed by the customer in a standardized window-type envelope. The customer (paying a bill) must orient the invoice relative to the window of the envelope, so that the return address printed on the invoice appears as the mailing address in the window of the envelope. This not only saves the cost of printing envelopes, but ensures that the invoices are all oriented in the same way relative to the envelopes. It is for this reason that the apparatus disclosed in the aforementioned patent need only operate to orient the accompanying check, to effectively orient all extracted documents for stacking.

However, it has recently become desirable to extend such operations to so-called "windowless" envelopes, where the invoice (and cheek) may now be randomly oriented relative to the envelope since the expedient of a window for orientation purposes is no longer available. In such case, after the invoices are removed, each invoice can be oriented relative to the apparatus in one of four positions; with the relevant (information bearing) side of the invoice facing front or to the rear, and upright or inverted. The combination of these two factors creates four possible orientations for an invoice passing through the apparatus.

In an automated, high-speed bulk mail processing system, the orientation of a document is often of crucial importance. Very often the extracted documents are to be scanned for various information-gathering purposes (e.g., machine code is read, numerical amounts are entered for data processing, to verify proper signatures, etc.). In order to carry out such operations, it is essential that all of the documents are uniformly oriented, generally with their top edges facing up and with their front sides facing forward. For "windowless" envelopes, this was previously not possible, even with the apparatus previously described.

SUMMARY OF THE INVENTION

It is therefore the primary object of the present invention to automatically inspect a series of documents arranged in random orientations, to determine the orientation of such documents relative to a given reference.

It is another object of the present invention to automatically inspect a series of documents arranged in random orientations, to determine their orientation so that documents may be mechanically re-oriented, as needed, for subsequent processing in a uniform, desired orientation.

It is another object of the present invention to facilitate such inspection without significantly reducing the speed of the bulk-mail processing system with which it is used.

It is another object of the present invention to achieve the foregoing objects with a system which may be easily incorporated into existing bulk-mail processing equipment.

It is another object of the present invention to achieve the foregoing objects without having to specially design or redesign the documents which are to be processed, to accommodate the document-orienting system.

These and other objects which will become apparent are achieved in accordance with the present invention by optically inspecting each in a series of documents being processed, and by comparing each optically inspected document with a reference standard to identify the orientation of the document relative to a specified reference. To this end, an image acquired from the document (preferably from each side of the document) is focused on an array of picture elements (pixels) for electronically converting the acquired image to digital form. This produces a digitally encoded image, which can be enhanced if desired, defined by an array of pixels corresponding to the acquired image. For each acquired image, two reference areas, which are preferably symmetrically located on the document, are inspected for the presence of a preselected reference mark. Location of the reference mark in one of the two reference areas operates to determine the orientation of the document.

Upon locating the reference mark on the document, identifying the orientation of the document relative to the apparatus, the document may then be mechanically re-oriented so that the documents are placed in a uniform orientation for further processing, if desired.

BRIEF DESCRIPTION OF THE DRAWINGS

FIG. 5 schematically illustrates a typical document for inspection in accordance with the present invention.

FIG. 6 is a view similar to that of FIG. 5, which diagrammatically illustrates the optical scanning techniques employed in accordance with the present invention.

In the several views provided, like reference numbers denote similar structures.

DETAILED DESCRIPTION OF THE INVENTION

Figure 1:
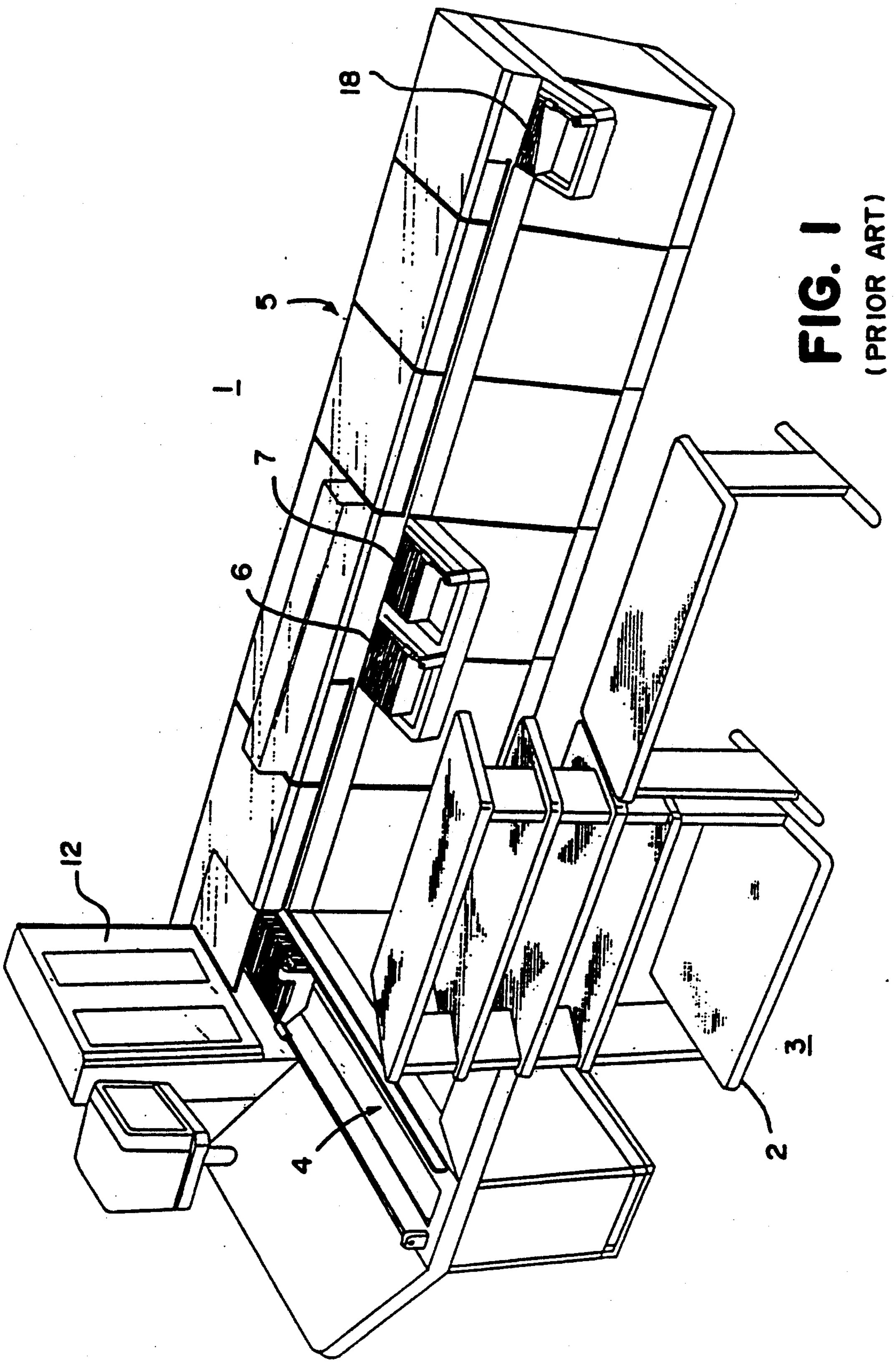
FIG. 1 (PRIOR ART)
FIG. 1 is an isometric view of an automated bulk mail processing apparatus, known in the prior art.
Figure 2:
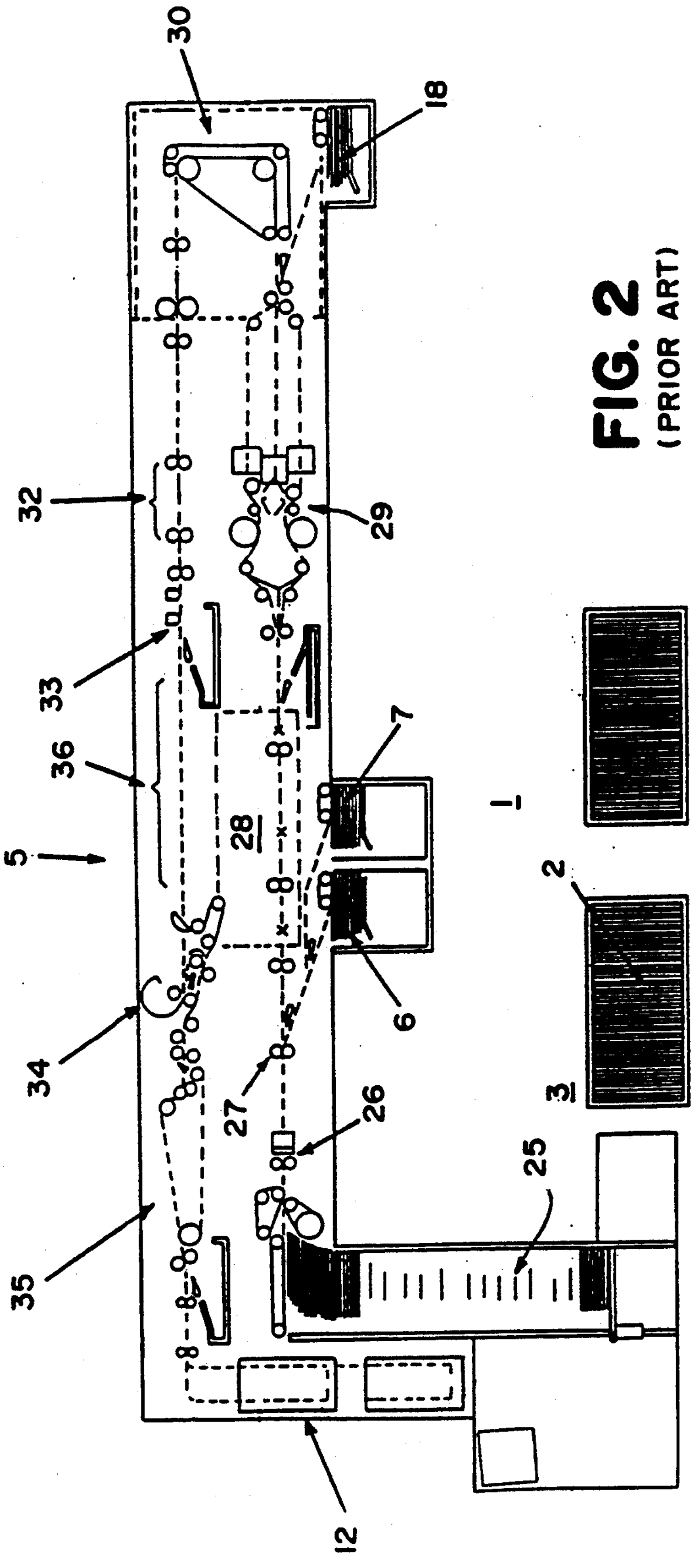
FIG. 2 (PRIOR ART)
FIG. 2 is a top plan view of the bulk mail processing apparatus of FIG. 1.
Figure 3:
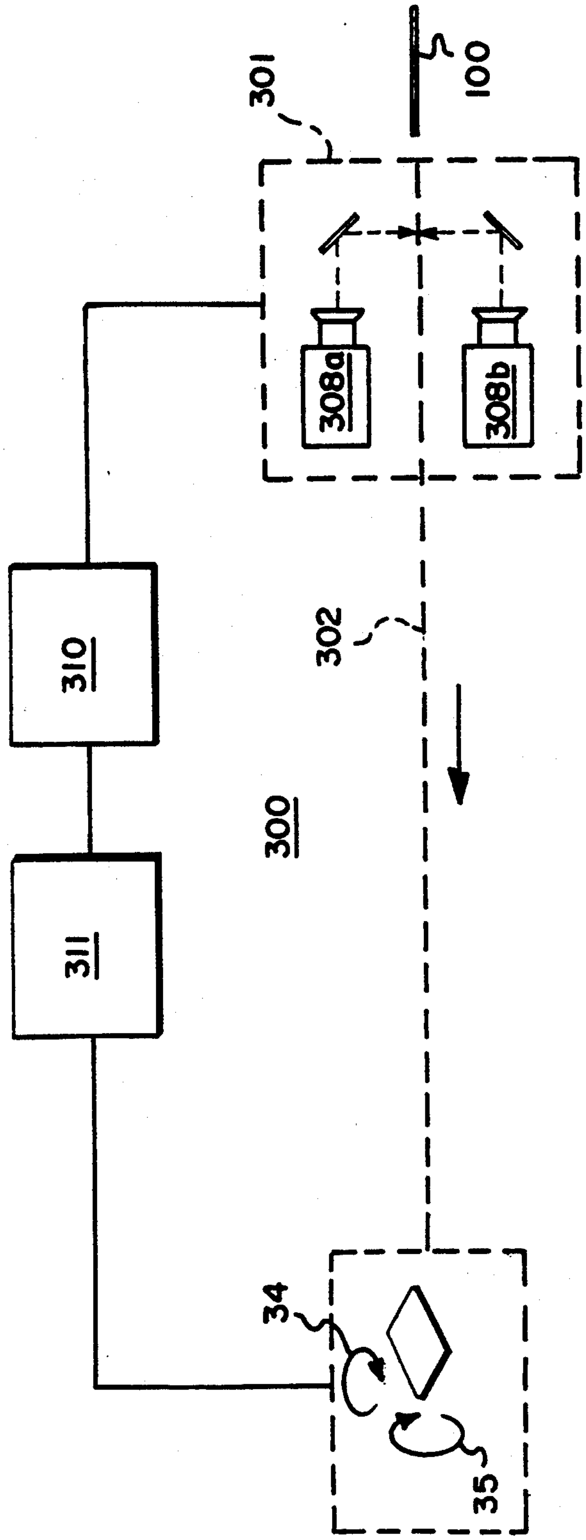
FIG. 3 is a block diagram of the operative components of the optical scanning system of the present invention.

FIG. 3 is an overall block diagram showing the basic components of the present invention. To this end, a series of documents 100 are passed through an optical scanning system 300, along a path marked by dotted lines 302. The optical scanning system 300 includes a scanning apparatus 301 having a pair of cameras 308*a*, 308*b* for optically inspecting both sides of each document 100. Images acquired from the sides of each document 100 are accumulated in memory 310, for further processing at 311 to determine the physical orientation of each document by locating a preselected reference mark on the document. Once this orientation is determined, means (such as the reversal station 34 and the twisting station 35 of FIGS. 1 and 2), can be used to mechanically reorient documents in the series so that all of the documents are uniformly oriented relative to the associated apparatus.

Specifics regarding the mechanics of a reversal station (shown at 34) and a twisting station (shown at 35) for reorienting documents 100 are described in detail in the above identified patent incorporated by reference herein. The present specification is primarily directed to the optical scanning and processing of images acquired from each document, for determining the orientation of each document as it passes through the apparatus with which the optical scanning system 300 is associated. The various elements of the present invention will now be discussed in further detail under separate headings.

The Optical Scanning Apparatus

Figure 4:
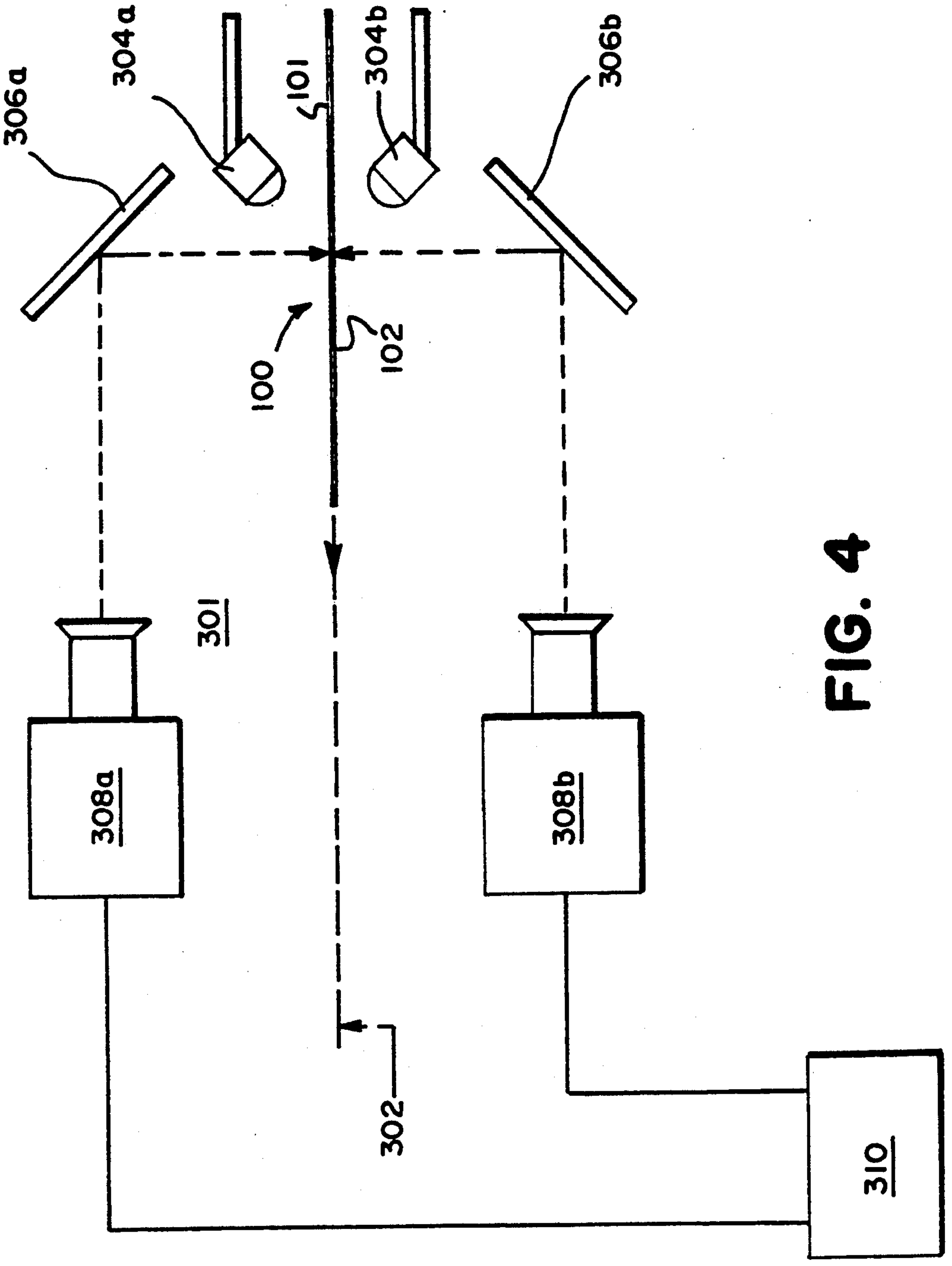
FIG. 4 is a schematic plan view of the optical scanning apparatus.

FIG. 4 shows a schematic plan view of the optical scanning apparatus 301. Such an apparatus is advantageously placed, for example, at station 36 in the bulk-mail processing apparatus 1 shown in FIGS. 1 and 2. In any event, the optical scanning apparatus 301 is preferably placed in line with the path 302 for the extracted documents (the contents of the envelopes being emptied) which are to be processed and placed in stacks by the bulk mail processing apparatus.

For example, the document 100 may be a check which has been extracted from an envelope, and which progresses along the path 302. However, since the detection station 33 of the disclosed bulk-mail processing apparatus 1 already operates to orient checks (for windowed or windowless envelopes), further analysis of the checks will generally be unnecessary in cases where a detection station 33 has been employed. Alternatively, and in the present case more importantly, the document 100 may be an invoice which has been extracted from an envelope, and which progresses along the path 302. This is so because means for determining the orientation of an invoice extracted from an envelope were not yet available in conjunction with the bulk-mail processing apparatus 1. It would also be possible, although generally not necessary, to use the optical scanning apparatus 301 of the present invention to orient both the invoice and the check extracted from an envelope, eliminating the need for the detection station 33 of the bulk-mail processing apparatus 1 in such case.

In any event, the document 100 to be analyzed is caused to pass along the path 302 and between a pair of light (preferably white light) sources 30*a*, 304*b*. The light source 304*a* illuminates a first side 101 of the document 100 as it passes along the path 302, for observation by a first camera 308*a* (in cooperation with a reflective mirror 306a). A second side 102 of the document 100 is similarly illuminated by the light source 304b, for observation by a second camera 308b (in cooperation with a reflective mirror 306b).

Preferably, the light sources 304a, 304b are fiber-optic light sources, themselves known in the art, which operate to produce a relatively intense, generally slit-shaped band of light for application to the respective sides 101, 102 of the document 100 as it passes along the path 302. The cameras 308a, 308b are scanning cameras, also known in the art, for acquiring images from the sides 101, 102 of the document 100, which are preferably configured to acquire an image as an array of picture receiving elements (pixels). In the preferred embodiment, the cameras 308a, 308b are monochromatic and capable of discerning gray levels on a scale of from 0 to 255, forming an array of 512 pixels by 1 pixel. Thus, each camera operates to acquire a series of images corresponding to plural (very thin) lines developed across the document 100 as the document passes (continuously) along the path 302. The cameras 308a, 308b, in effect, take "slices" of the image of each side of the document, each slice being equivalent to one pixel in width. The number of slices needed to acquire the image of the entire document 100 will vary depending on the length of the document. Irrespective of this number, the acquired images (slices) are converted to an electrical signal for application to and accumulation within memory 310, also known in the art, to assemble what essentially constitutes a composite picture of each side of the document.

The optical scanning apparatus 301 is also sensitive to sudden changes in light intensity, for example, from a generally "dark" signal to a generally "light" signal, corresponding to the passage of a leading edge 103 of the document 100 between the cameras 308a and 308b. This change in level can therefore be used to initiate operations of the cameras 308a, 308b, and memory 310, to accumulate "slices" of data from the passing document in order to acquire an image corresponding to the sides of the document 100, and to initiate the processing of acquired data, at 311, as follows.

The Optical Scanning Procedure

The optical scanning procedure can generally be considered to constitute a combined analysis of whether the document is upright or inverted, and an analysis of whether the document is facing toward the front or toward the back. To simplify explanation of the overall procedure, determination of whether the document is upright or inverted will first be addressed. Thereafter, determination of whether the document faces toward the front or toward the back will be considered.

FIG. 5 shows a representative document 100, in the form of an invoice (such as would typically be submitted by a customer, along with a check, in payments made to a utility or credit card company). As noted above, each document 100 has two sides 101 and 102. In this example, side 101 is shown as an "information-bearing" side. Because the document 100 is an invoice (which is provided by the company which is to receive the payment), there will be certain uniformities in each document 100 resulting from the pre-printed markings which are used to convey information to the customers. Typical among such uniformities is the return address of the company, at 104, which is sometimes placed in a position to be aligned with a window in the envelope which is supplied for return of the invoice (with payment) to the company, and which is at other times simply enclosed in a windowless (preprinted) envelope. Other markings typically appearing on the document 100 might include a company logo or symbol 106. Miscellaneous written information may appear at various locations on the document 100, such as the customer's address, at 108, or amounts due, at 109. Often, there is machine-readable code printed on the document 100, such as at position 110. Many invoices include not only an amount due, which has been machine-printed on the document at 112, but also a space at 114, where the customer is asked to write (on the returned document) the amount being remitted, which may or may not be equal to the amount due. Often such documents will include special boxes, such as at 120 or 122, where the customer can mark special notations such as a change in address or some other special handling request. Clearly, any of a number of variations are possible.

FIG. 6 shows an outline of the document 100 of FIG. 5, overlaid with two axes 130, 132 and two defined reference areas 134, 136. In determining whether a document is upright or inverted (assuming for now that the apparatus is viewing the front of the document), the following general analysis will take place. First, the apparatus will accumulate an array corresponding to the optically scanned signal taken from the entire (relevant) side 101 of the document 100. Then, the two symmetrically-arranged reference areas, here shown as 134 and 136, will be analyzed for the presence of "dark" areas indicative of the presence of a selected reference mark R (in this case a portion of the logo 106). If the invoice 100 passes through the apparatus while upright, as shown in FIG. 6, the reference mark R will appear in reference area 134 while reference area 136 will show a white space. If the document 100 is inverted as it passes through the apparatus, the reference mark R will appear in reference area 136 and reference area 134 will show a white space. The process can be thought of as viewing the relevant side of the document 100 through an opaque mask having holes corresponding to the reference areas 134 and 136. Depending upon whether the reference mark appears in a "hole" corresponding to the reference area 134, 136, the apparatus will recognize whether the document 100 is upright, or inverted. In the example shown in FIG. 6, appearance of the reference mark R in reference area 134 can be used to develop a signal (for subsequent application to an associated control system) which indicates that the invoice 100 is upright; whereas the appearance of the reference mark R in reference area 136 can be used to develop a signal which indicates that the invoice 100 is inverted.

To be most effective in determining the orientation of a document passing through the apparatus, the reference areas 134, 136 must be effectively selected. For example, it is important that the reference areas 134, 136 be arranged symmetrically relative to both axes 130, 132, so that a single reference mark will appear either in reference area 134 (when the document 100 is upright) or in reference area 136 (when the document 100 is inverted). More importantly, placement of the reference areas 134, 136 is generally selected not only so that the reference mark R will appear in one or the other reference area, but also so that when the reference mark R appears in one reference area, the remaining (symmetrically arranged) reference area will contain either no markings (a white space), or as few markings as is possible. There should also ideally be a maximum contrast (light to dark) between the reference area containing the reference mark and the reference area which does not, for reasons which will be explained more fully below.

Thus, in the example shown in FIGS. 5 and 6, the reference area 134 is selected for detection of the reference mark R, in the form of a portion of the logo 106. To be noted is that the reference area 134 does not encompass the entire logo 106. The reason for this is that the corresponding (mirror image) reference area 136 on the document 100 should generally preferably include nothing but white space, although in certain cases, useful selections of a reference area 136 including markings may be made provided an adequate differential is maintained between the corresponding reference areas 134, 136. If, in the present example, the reference area 134 was selected to be large enough to encompass all of the logo 106, the corresponding reference area 136 would then include some of the machine-readable code 110, which could reduce the overall effectiveness of the analysis to be performed. For example, the portion of the machine-readable code 110 which appears in reference area 136 could conceivably cause the optical scanning system to observe a dark area in both of the reference areas 134, 136, causing an error. However, in other cases, a selection of reference areas 134, 136 which both include markings may be useful, and at times even preferred.

Also to be considered in selecting the reference areas 134, 136 is that in operation, the placement of features on the document 100 will tend to vary due to tolerances and variations in the markings which are printed on the documents, as well as each document's alignment relative to the scanning apparatus 301. However, these variations are readily accommodated by adjusting the size and/or shape of the reference areas 134, 136, as well as certain adjustments which can be made in performing the processing steps which are to follow, and which will be described more fully below (e.g. , adjustment of the thresholds which are used to locate the reference mark R in a particular reference area).

In any event, selection of the reference areas 134, 136, and the reference mark R, can be performed empirically, if desired. However, automatic selection of the reference areas (and the reference mark) to be employed, is preferred, and a method for doing so will be described more fully below.

Detection of the reference mark R (i.e., the portion of logo 106 in the present example) in one of the reference areas 134, 136 is sufficient to determine whether the document 100 is upright or inverted. However, as mentioned above, it is also necessary to determine whether the document 100 is facing toward the front or toward the rear. To this end, both sides 101, 102 of the document 100 are inspected, making use of similarly (symmetrically) selected reference areas, even though only one side will bear the reference mark R. Different techniques are suitable for accomplishing this analysis, depending upon the nature of the document 100.

For example, if only one of the sides 101, 102 of the document 100 incorporates markings, and the other side is blank, it is possible to analyze the document by noting which of the cameras 308*a*, 308*b* has observed the side of the document with markings, and then only analyzing that side of the document 100. Alternatively, if both sides 101, 102 of the document 100 incorporate markings, an additional two (symmetrically-arranged) reference areas 138, 140 are defined on the second (remaining) side of the document, which correspond to possible locations for the reference mark R on that remaining side (essentially the same as the reference areas 134, 136, but as viewed by the camera on the opposite side of the document). Thus, in such case, the optical scanning system will have to check for the presence of the reference mark R in one of the four reference areas 134, 136, 138, 140, using techniques which are in essence duplications of those described above. To be noted is that in such case, care must be taken to ensure that in selecting the reference mark R, remaining, symmetrically defined regions of the document will be blank, or substantially so. If not, the (symmetrical) placement of the reference areas may have to be adjusted in order to prevent error in identifying the desired reference mark R due to markings found in other reference areas on the document.

Another possible alternative in analyzing the four reference areas 134, 136, 138, 140 is to transmit a bright light through the document 100, and making use of the translucence of the paper forming the document, to observe both sides of the document (and all four reference areas) with a single camera, thus scanning all four reference areas at the same time. In such case, however, proper symmetrical placement of all four reference areas, as well as sufficient translucence of the paper forming the document 100, is crucial to avoid error.

Analysis of a Reference Area

As previously described, each of the reference areas 134, 136, 138, 140 is optically analyzed for the presence of a desired reference mark R. To this end, for each side 101, 102 of the document 100 to be observed, an image is acquired by focusing the image on an array of picture elements (pixels) through means known to those skilled in the art. With equipment currently in common use, such observations may take place with a resolution of 512 pixels across the width of the document 100, and fully along its length (which can vary), in unit intervals. On this scale, a typical reference area 134 may have dimensions of, for example, 50 by 50 pixels (although as will be explained more fully below, the reference areas may be selected to have any of a variety of sizes and dimensions).

Figure 7:
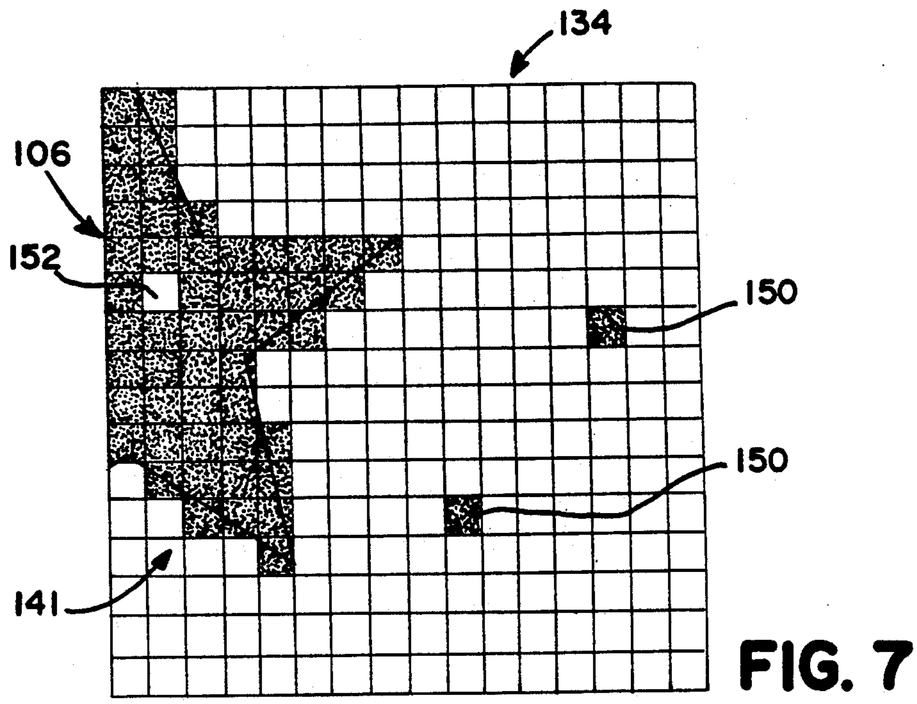
FIG. 7 is a graph illustration of an arrangement of pixels in a reference area which is produced in accordance with the present invention.

FIG. 7 schematically illustrates how a given reference area 134 is subdivided into an array 141 of pixels for further processing at 311 (FIG. 3). In FIG. 7, the previously postulated image of a portion of the logo 106, which serves as the reference mark R in the example provided, is shown superimposed on the array 141. This results from focusing the reference area 134 on the array 141 of pixels so that certain of the pixels will be affected by the light which is received, and so that others will not. Equipment currently in common use for the optical scanning of articles is capable of discerning gradations of light (gray scale) on a scale of from 0 (representing black) to 255 (representing white). If the selected reference mark happens to be printed in a particular color, the reference mark will appear to the array of pixels as a particular shade of gray since monochromatic cameras are preferred in accordance with the present invention. To be noted is that color cameras could also be used, if desired.

To simplify subsequent data processing, the preferred embodiment of the invention includes a system (which may be embodied in software) for converting the image acquired on the array of pixels into a high-contrast, enhanced image, in black and white. This enhanced image is obtained by thresholding for selected shades of gray, and defining a pixel as "black" if the original image is sufficiently dark to develop a gray level below a given threshold, or "white" if the original image is sufficiently light to develop a gray level above that threshold. This results in a high-contrast image, which in essence filters out intermediate shades of gray on the original image. As a result, even if the reference mark R was originally printed in blue, which would then register on the array of pixels as a particular shade of gray, if the resulting gray level is sufficiently dark (i.e., below the threshold level), the system will consider the pixel to be "black". Otherwise, the pixel will be considered to be "white".

The resulting (enhanced) image will then constitute an array of "black" pixels 150 and "white" pixels 152, as shown in FIG. 7, which fairly closely follows the shape of the original image (other than spurious black pixels in an otherwise white area, and spurious white pixels in an otherwise black area, due to stray markings or printing inconsistencies). However, as will be explained below, these anomalies are taken into account statistically, later in the analysis. Once the enhanced images corresponding to the reference areas for a document 100 are created, determination of the presence of the reference mark is accomplished by counting the number of black pixels, in proportion to the total number of pixels in a given reference area. If the observed reference area includes no markings, this count will be very small (ideally zero). If the observed reference area includes the reference mark, a significant number of black pixels will be counted. Proper selection of the reference mark, and the reference areas, will lead to a significant range (differential) of black pixels in a given reference area, enabling a clear identification of the location of the reference mark.

Figure 8:
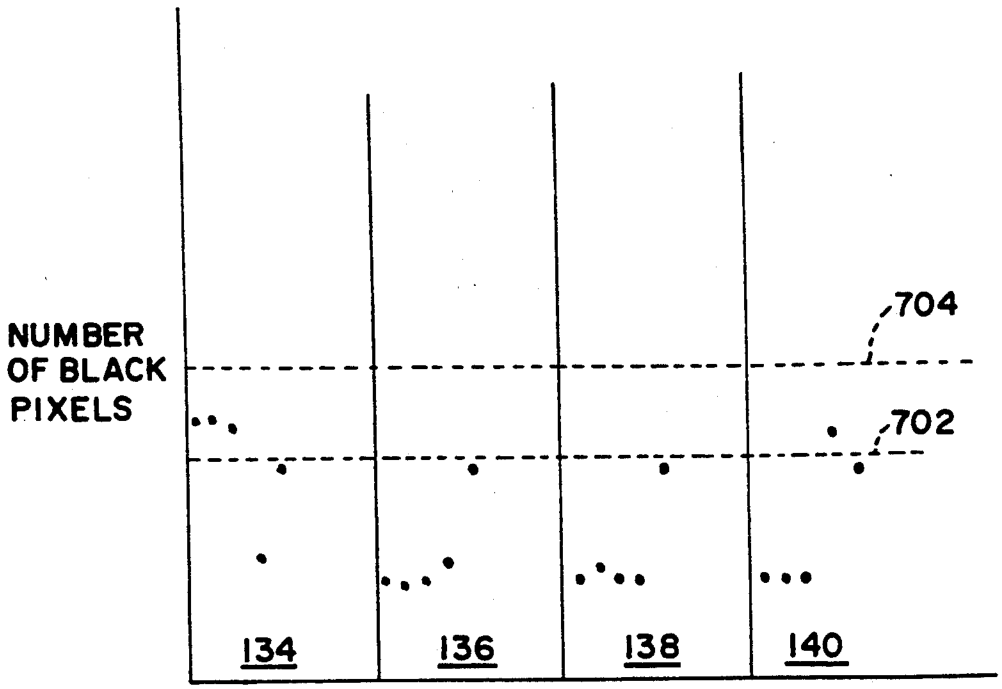
FIG. 8 is a graph illustrating a cumulative analysis of a series of documents being processed, which can be performed in accordance with the present invention.

FIG. 8 shows a graphical analysis of a typical "run" of a series of invoices, which can be performed in accordance with the present invention. The y-axis of the graph represents a count of the number of black pixels in a given reference area, for documents passing through the system. The x-axis is divided into four sections, one for each of the reference areas which have been established. Each section of the x-axis, moving from left to right, exhibits a series of dots representative of the number of black pixels counted in each reference area for a given document passing through the system. Thus, in this graph, each document 100 passing through the system will produce up to four dots, one for each section, representative of the number of black pixels counted in each reference area.

Looking at a typical pattern, shown in FIG. 8, it can be seen that in the first section, for the first three documents passing through the system, large counts of black pixels are shown for the reference area 134. This is evident from the first three dots shown to the left of the first section, which are relatively highly positioned on the y-axis, as distinguished from the first three dots in the remaining sections, which are relatively low. Because the number of black pixels in the reference area 134 is relatively high when compared with the number of black pixels in the remaining three reference areas of the three documents under analysis, the system will recognize that the desired reference mark is located in the reference area 134, enabling an identification of that document's orientation relative to the apparatus. This will then determine any inversions (front to rear or top to bottom) which may be required to orient the analyzed documents relative to the apparatus. For a fourth document to be analyzed, the reference mark is seen to appear in the reference area 140, since the fourth dot in each section indicates a large number of black pixels in the reference area 140, and relatively few black pixels in the remaining reference areas on the document. This then operates to identify the orientation of the fourth document under analysis, which differs from that of the first three documents which were analyzed, and establishes any inversions which might be needed to orient the fourth document relative to the apparatus (in the same orientation as the first three documents).

Whether or not the count of black pixels in a given reference area for a particular document is sufficient to constitute a detected reference mark is determined according to a set threshold of black pixels. For example, in FIG. 8, the graph is shown with a lower threshold of black pixels marked by the dotted line at 702. If the number of black pixels in a given area lies above the lower threshold 702 in one reference area, and below the lower threshold 702 in each of the three remaining reference areas, this will constitute a determination that the reference mark lies within the given area, accordingly identifying the orientation of the document.

In actual applications, primarily due to high scanning speeds or poor physical condition of the documents, a clear difference between the presence or absence of a reference mark in a particular reference area may not always be possible. For example, for a fifth document depicted in FIG. 8, each of the dots lie just below the threshold 702. This may be the result of an improper or damaged invoice, leading to an anomalous number of black pixels in the several reference areas. Such a situation could occur when none of the reference areas have a sufficient number of black pixels to exceed the threshold 702 or, alternatively, if more than one of the reference areas is determined to include a sufficient number of black pixels. In such cases, the anomalous documents may be marked, or out-sorted for separate treatment, as desired.

In addition to a lower threshold of black pixels 702, some applications may also require the development of an upper threshold of black pixels, as shown at 704. This may be required for special applications, such as when the reference mark has a color which requires the system to identify a relatively narrow range of gray levels, or if the reference mark is of a somewhat complicated design which will require the system to identify a specific range of black pixels in a selected reference area.

The foregoing describes an apparatus for determining the orientation of a document relative to the apparatus, making use of identifying markings associated with that document. The resulting data may then be used to reorient the document, as desired, depending upon its determined orientation and the orientation at which it is subsequently to be processed. Any document bearing characteristic markings may be subjected to such procedures, including cheeks, invoices, both such documents, or even envelopes prior to the extraction of documents, as desired. The following describes additional features, which may be achieved according to the present invention, to further enhance such a system's capabilities.

Special Functions

In practice, it is common for an invoice to include one or more special boxes which the customer can mark in cases where special treatment is called for, such as a change of address, or to note an error on the document. These boxes are typically preprinted on the return invoice, and are marked by the customer in the event that such special treatment is called for. Due to their uniform placement on the invoice, such special treatment boxes can be inspected with the optical scanning system 300 of the present invention, to identify documents which require special handling, as follows.

Referring again to FIG. 5, two such special-function boxes 120, 122 are shown on the document 100. Generally speaking, these boxes may be treated (by the optical scanning system of the present invention) as though they were an extra set of reference areas to be checked for a reference mark. However, in the case of boxes which are to be marked by a customer, the reference mark to be searched for will not be a standardized part of the printed document, but rather will be a handwritten mark which will tend to vary from customer to customer. For example, the reference mark placed by the customer may be made with anything from a fine pencil to a thick felt marker. Other variations will also occur. For this reason, in searching for reference marks in special-function boxes, greater latitude is necessary (in terms of selection of the threshold number of black pixels) in determining whether a box has in fact been marked.

Another concern in searching for the presence of a reference mark in a special-function box 120, 122 involves the particular orientation of the special-function box (or boxes) relative to the document 100, which may be in any one of four orientations. This is because the system must know where on the document to search for the special-function box, to avoid searching incorrect regions which might bear other markings. There are different ways of solving this problem. For example, in considering a single special-function box on the document, the special-function box could be in any one of four different positions on the images acquired from the document, depending on the orientation of the document. Steps could be taken to analyze all four possible positions for the special-function box, to search for a check-mark, and to then interact with the previously described system for locating the reference mark on the document to determine which of the four possible positions actually contains the special-function box. Alternatively, after the reference mark has been found, and the orientation of the document has been determined, the special-function box could be located, and inspected for the presence of a cheek-mark. Another possibility is to wait until after the reference mark has been found and the document has been mechanically reoriented, to then check the (now uniformly located) special-function box for a check-mark. However, this latter method is somewhat more expensive in that a second optical scanning, or analysis, will be required.

Once the location of the special-function box has been determined (on the acquired image), the next step is to determine whether it contains a special mark. For example, the box may have been completely filled in with a marker, or may have been only lightly checked with a pencil. The system must therefore be sensitive to a wide latitude of images which might appear in the special-function box. For this reason, in the preferred embodiment of the present invention, when the image acquired from the document 100 is first converted to an (enhanced) array of black and white pixels, the thresholds (for example, the thresholds 702 and 704 in FIG. 8) for determining when a pixel is black (caused by the presence of a mark in the special-function box 120, 122) should be set rather wide. For example, the threshold corresponding to the threshold 702 in FIG. 8 should be set relatively low for special-function boxes, so as to detect lightly marked boxes, while the threshold corresponding to the threshold 704 in FIG. 8 should be set relatively high, up to its maximum value.

In any event, when a given document 100 is found to have a mark in one or more of the special-function boxes 120, 122, the document 100 may be marked, or out-sorted for special treatment, as desired.

Yet another special function of the apparatus of the present invention involves the selection of an appropriate reference mark for efficient, low-error operations to take place. There are numerous criteria for selecting an appropriate reference mark for such purposes. For example, the mark should be reasonably dark and distinct, and should be uniform throughout the entire series of documents being processed. What is more, the area representing the mirror image of the selected reference mark, through each of the axes 130, 132, must be relatively free of markings so that it will not be necessary to make fine distinctions in gradation (gray scale) between a reference area and its symmetrical counterparts. Ideally, the reference mark should be rather dark, while the corresponding (symmetrical) reference areas should have no markings at all. For the document 100, described above, the reference mark R was selected so as not to correspond to the entire logo 106, but rather to only a portion of that logo. This is because, had the entire logo 106 been used, the corresponding reference area (in the other quadrant of the document) would have included markings which could conceivably cause error.

In the preferred embodiment of the present invention, an automatic system is provided for scanning the entire image acquired from the information-bearing side of the document, and for deciding the position and dimension of the "best possible" reference mark. The process for finding this "best possible" reference mark commences with a scanning of the entire document (by processing the array of pixels in ¼"-square boxes); correlating each of the scanned squares with its corresponding reference area (symmetrically located about the axes 130, 132); and comparing the relative number of black pixels for each established pair of sample boxes. A select number, such as twenty pairs of sample boxes are then identified which exhibit the greatest difference in the number of black pixels between them. The selected series of paired boxes are then displayed for the operator, to select a reference mark for use in subsequent analyses of the document under inspection (which at times must be an empirical selection based upon experience with previous "runs"). In addition to these basic operations, enhanced selections are made possible, if desired, by manipulating (in software) the borders of the selected (twenty) boxes in two dimensions, increasing their dimensions to include more dark area and decreasing their dimensions to exclude white area. In doing so, attention must be given to the corresponding sample box, which is similarly adjusted, so that a minimal dark area is included in the (adjusted) corresponding sample box as the primarily sample box is expanded to include more black area. Preference is given to paired boxes in which the lighter box contains a minimum (preferably zero) amount of black area.

The foregoing describes a system for optically acquiring an image from a document (in a series of documents), and for determining that document by analyzing the acquired image in a processor. In a microfiche Appendix submitted in connection with this patent application a computer program listing is provided for implementing the above-described system, making use of the following system components.

| | Vendor | Part No. |
|---|---|---|
| Cameras 308a, 308b | EG & G Corp. | LC1901 |
| Memory 310 | Epix Corp. | 1MEGVID |
| Processor 311 | Intel Corp. | 302/20PC |
| Image Processing | Epix Corp. | 1MEGVID |
| Cards | Poynting Products, Inc. | RET4MEG-LC |

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for determining the orientation of a document, comprising:

means for optionally inspecting the document, and for providing electrical signals representing an image acquired from the document;

means for processing the electrical signals, including means for comparing selected portions of the acquired image with a reference standard, and means for identifying the orientation of the document responsive to the comparing means; and means for automatically selecting the portions of the acquired image which are to be compared with the reference standard, including means for correlating each of a plurality of defined regions of the acquired image with a corresponding mirror-image region, means for comparing relative densities of any markings located in each of the defined regions with any markings located in the corresponding mirror-image region, and means for identifying a selected number of compared regions and mirror-image regions having the greatest relative densities.

2. The apparatus of claim 1 which further includes means for adjusting boundaries of the selected number of compared regions to increase relative densities by increasing and decreasing light and dark areas defined within the compared regions.

3. A method for determining the orientation of a document, comprising the steps of:

optically inspecting the document, providing electrical signals representing an image acquired from the document;

processing the electrical signals, including comparing selected portions of the acquired image with a reference standard, and identifying the orientation of the document responsive to the comparing; and automatically selecting the portions of the acquired image which are to be compared with the reference standard by correlating each of a plurality of defined regions of the acquired image with a corresponding mirror-image region, comparing relative densities of any markings located in each of the defined regions with any markings located in the corresponding mirror-image region, and identifying a selected number of compared regions and mirror-image regions having the greatest relative densities.

4. The method of claim 3 which further includes adjusting boundaries of the selected number of compared regions to increase relative densities by increasing and decreasing light and dark areas defined within the compared regions.

* * * * *